Figure 1:
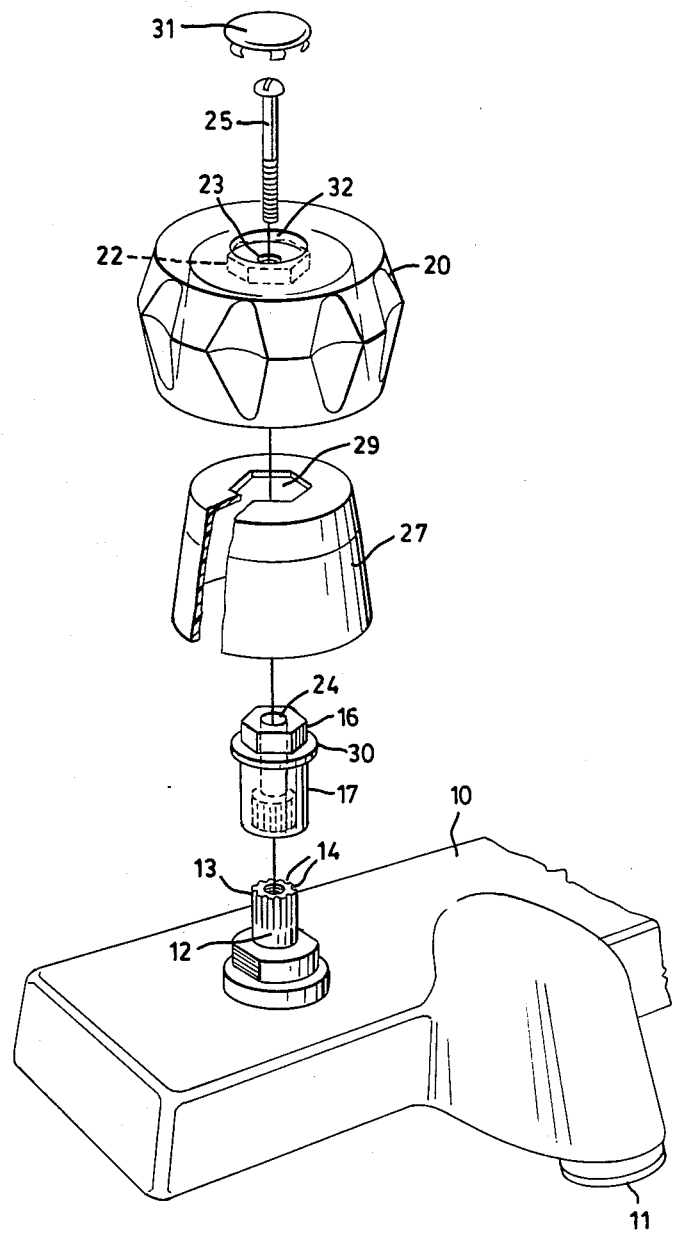

United States Patent [19]

Bondar

[11] Patent Number: 4,616,673
[45] Date of Patent: Oct. 14, 1986

[54] REPLACEMENT FAUCET HANDLE KIT

[76] Inventor: Jerry Bondar, 43 Lissom Crescent, Willowdale, Ontario, Canada, M2R 2P2

[21] Appl. No.: 805,266

[22] Filed: Dec. 6, 1985

Related U.S. Application Data

[63] Continuation of Ser. No. 715,589, Mar. 25, 1985, abandoned, which is a continuation of Ser. No. 422,480, Sep. 23, 1982, abandoned.

[30] Foreign Application Priority Data

May 21, 1982 [CA] Canada ................................. 403591

[51] Int. Cl.$^4$ .............................................. F16K 31/60
[52] U.S. Cl. ..................................... 137/315; 16/121; 74/553; 251/291; 403/359
[58] Field of Search ........................... 16/121; 74/553; 251/291; 403/359; 137/315

[56]  References Cited

U.S. PATENT DOCUMENTS

| | | |
|---|---|---|
| 589,362 | 8/1897 | Miles . |
| 1,707,353 | 4/1929 | Fraser ............................. 251/292 X |
| 1,741,588 | 12/1929 | Schneider ........................ 251/291 X |
| 1,923,691 | 8/1933 | Schornstein ..................... 251/291 X |
| 1,929,536 | 10/1933 | Schulte . |
| 2,389,599 | 11/1945 | Delany . |
| 2,504,610 | 4/1950 | Wolf . |
| 2,781,786 | 2/1957 | Young . |
| 3,396,604 | 8/1968 | Samuels et al. .................... 16/121 X |
| 3,502,355 | 3/1970 | Demler et al. . |
| 3,572,162 | 3/1971 | Gresham et al. . |
| 3,582,116 | 6/1971 | Young ............................... 403/359 |
| 3,758,920 | 9/1973 | Dobrjanskyj et al. . |
| 3,776,373 | 12/1973 | Mullen . |
| 3,791,402 | 2/1974 | Shuler . |
| 3,965,528 | 6/1976 | Kissler ............................ 403/359 X |
| 3,994,608 | 11/1977 | Swiderski et al. . |
| 4,000,539 | 1/1977 | Neyer . |
| 4,065,216 | 1/1977 | Nelson . |
| 4,346,735 | 8/1982 | Raz . |

Primary Examiner—Gerald A. Michalsky
Attorney, Agent, or Firm—Ridout & Maybee

[57] ABSTRACT

In a replacement faucet handle kit of simple and inexpensive form there is included a plurality of adapters each having a first end portion and a second end portion. The first end portions of the adapters are substantially identical and of non-circular, transverse cross-sectional configuration, such as hexagonal transverse cross-section, complementary to the transverse cross-sectional configuration of a recess in the underface of the replacement faucet handle, and the second end portion of each adapter has a bore of non-circular, transverse cross-sectional configuration, with the second end portion of each adapter differing from the second end portion of each remaining adapter with respect to one or more of the following characteristics, namely, the length thereof, the length of the bore therein, the transverse cross-sectional configuration of the bore therein, and the transverse cross-sectional dimensions of the bore therein, the bores in the adapters having transverse cross-sectional configurations and dimensions which are complementary, and of corresponding length, to the upper end portions of the valve stems of faucet valves of different manufacturers. Thus, a selected one of the adapters, the bore in which has a transverse cross-sectional configuration and dimensions complementary, and of corresponding length, to the upstanding end portion of a valve stem, may be non-rotatably mounted on the valve stem, with the replacement faucet handle being non-rotatably mounted on the selected adapter the length of the second end portion of which is such that the replacement faucet handle is at substantially the same pre-determined level as the former faucet handle.

3 Claims, 4 Drawing Figures

REPLACEMENT FAUCET HANDLE KIT

This application is a continuation of application Ser. No. 06/715,589, filed Mar. 25, 1985, now abandoned, which is a continuation of application Ser. No. 06/422,480, filed Sept. 23, 1982, now abandoned.

This invention is concerned with a kit of parts for replacement of a faucet handle in an existing faucet installation. In a faucet installation consisting of original manufacturer's equipment the valve of the faucet installation conventionally has an upstanding valve stem the upper end portion of which is of non-circular, transverse cross-sectional configuration, with an underface of the faucet handle having a bore of complementary length and complementary transverse cross-sectional configuration and dimensions, so that with the upper end portion of the faucet valve stem disposed within the bore in the handle the handle is non-rotatably mounted at a pre-determined level on the valve stem and turning of the faucet handle results in turning of the valve stem and hence opening or closing of the faucet valve. The upper end portion of the faucet valve stem is generally of cylindrical form having a series of equi-angularly spaced, longitudinally extending spline grooves, with the bore in the faucet handle being of corresponding length and cylindrical form having a corresponding series of equi-angularly spaced, longitudinally extending ribs which, with the handle mounted on the valve stem, are engaged within the spline grooves in the upper end portion of the valve stem.

Through use of the faucet installation over an extended period of time the ribs in the bore provided in the faucet handle may become broken or otherwise damaged and this necessitates replacement of the faucet handle, unless of course the entire faucet valve and handle are replaced which is more expensive and in many cases unnecessary.

A problem in relation to the provision of replacement faucet handle kits is that there have been no generally accepted standards in the industry for the length and transverse cross-sectional configuration and dimensions of the upper end portions of the faucet valve stems, or for the level of the handle when mounted on the valve stems. Thus, in relation to the above-described transverse cross-sectional configuration of the upper end portions of the faucet valve stems the diameters of, and the number and dimensions of the splined grooves formed in, the upper end portions of the valve stems vary substantially among manufacturers. With the view to overcoming this problem there has hitherto been proposed and used a replacement faucet handle kit which comprises a replacement faucet handle together with an adapter which is adapted to be non-rotatably mounted within a recess in the underface of the handle, the adapter having a central opening which is of sufficiently large diameter to accommodate the upper end portions of the faucet valve stems which are of the largest transverse cross-sectional dimensions currently in use, with three or more grub screws being screw-threadedly mounted in the adapter and being adapted to be tightened against the upper end portion of the valve stem. However, this solution to the problem has not proved entirely satisfactory, since the grub screws may become loose or otherwise fail to remain securely in engagement with the upper end portion of the valve stem, particularly after the faucet installation incorporating the replacement handle has been in prolonged use.

U.S. Pat. No. 3,572,162 which issued on Mar. 23, 1970 to W. F. Gresham et al discloses an alternative structure which incorporates an adapter 15, but this structure of Gresham et al is comparatively complicated and hence expensive, and incorporates a spring such as the spring 33 of FIGS. 1 through 3 to secure the adapter 15 to the handle. This spring which is an essential feature of the structure of Gresham et al is, of course, susceptible to breakage or other damage particularly through prolonged use of the faucet installation.

It is accordingly a primary object of the present invention to provide a replacement faucet handle kit in which the above-described disadvantages of the previously known and used structures are substantially overcome or mitigated.

In accordance with the present invention there is provided a kit of parts which comprises a replacement faucet handle having an underface, a recess provided in said underface of the handle, and a plurality of adapters each having a first end portion and a second end portion. The first end portions of the adapters are substantially identical and are each of non-circular, transverse cross-sectional configuration complementary to the transverse cross-sectional configuration of the recess in the handle, the second end portion of each adapter having a bore of non-circular, transverse cross-sectional configuration, with the second end portion of each adapter differing from the second end portion of each remaining adapter with respect to at least one characteristic selected from the group of characteristics consisting of the length thereof, the length of the bore therein, the transverse cross-sectional configuration of the bore therein, and the transverse cross-sectional dimensions of the bore therein. Means is provided for permitting securement of the handle and a selected one of the adapters, the length and transverse, cross-sectional configuration and dimensions of the bore in the second end portion of which are complementary to the length and transverse cross-sectional configuration and dimensions of an upper end portion of a faucet valve stem, to the upper end portion of the faucet valve stem. Said selected one of the adapters is adapted to be non-rotatably mounted on the upper end portion of the faucet valve stem by disposing the upper end portion of said faucet valve stem within said bore in the second end portion of said selected one of the adapters, and the handle is adapted to be non-rotatably mounted on said selected one of the adapters by disposing the first end portion of said selected one of the adapters within the recess in the handle, with the handle and said selected one of the adapters being securable to the upper end portion of the faucet valve stem.

In order that the present invention may be more clearly understood and more readily carried into effect the same will now, by way of example, be more fully described with reference to the accompanying drawings in which FIG. 1 is an exploded view of a faucet installation incorporating parts of a replacement faucet handle kit according to a preferred embodiment of the invention.

Figure 2:
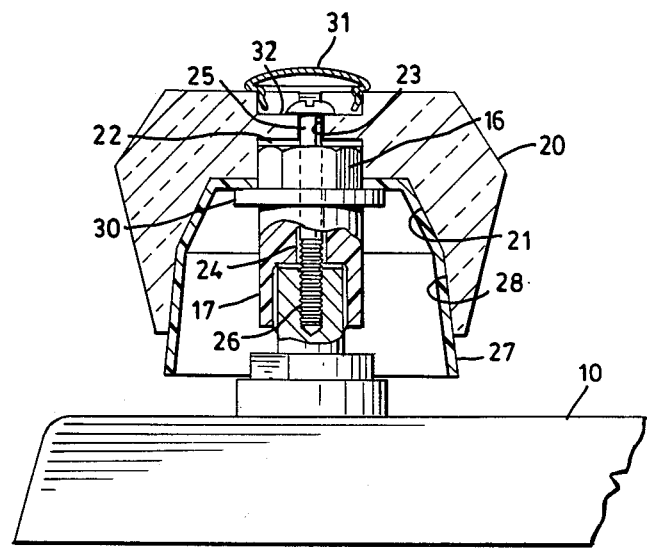
Figures 3, 4:
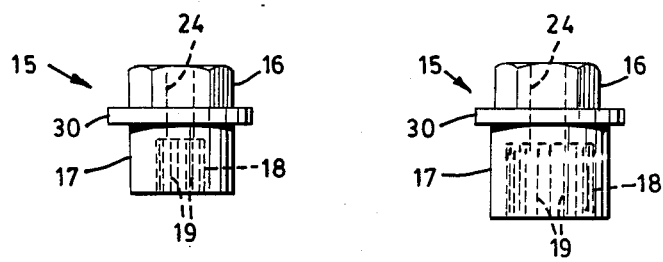

FIG. 2 is a sectioned view of the faucet installation of FIG. 1 shown in its fully assembled condition; and FIGS. 3 and 4 are views of two parts of the replacement faucet handle kit according to the preferred embodiment of the invention.

Referring to the drawings, 10 denotes generally a casing under which is disposed a faucet valve which may be of conventional form and which operatively controls the supply of water through associated pipes (not shown) to a spout 11 from which the water is operatively discharged into, for example, an associated sink or wash hand basin. The faucet valve has an upstanding valve stem 12 turning of which results in opening or closing of the faucet valve, the upper end portion 13 of the valve stem 12 being of non-circular, transverse cross-sectional configuration. Thus, this upper end portion 13 of the valve stem 12 may, as shown in the drawings, be of cylindrical form having equiangularly spaced, longitudinally extending spline grooves 14, as is conventional in the art.

In accordance with the present invention there is provided a replacement faucet handle 20. A replacement faucet handle kit according to the invention also comprises a plurality of adapters 15 two of which are shown in FIGS. 3 and 4. Each of these adapters 15 which may be of molded nylon comprises a first end portion 16 and a second end portion 17, the first end portions 16 of all the adapters 15 being substantially identical and each being of non-circular, transverse cross-sectional configuration, such as of hexagonal transverse cross-sectional configuration, for a purpose hereinafter explained. The second end portions 17 of the adapters 15 each have a bore 18 of non-circular transverse cross-sectional configuration, with the second end portion 17 of each adapter 15 differing from the second end portion 17 of each remaining adapter 15 with respect to one or more of the following characterics, namely, the length of the second end portion 17, the length of the bore 18 in the second end portion 17, the transverse cross-sectional configuration of the bore 18 in the second end portion 17, and the transverse cross-sectional dimensions of the bore 18 in the second end portion 17. The transverse, cross-sectional configuration and dimensions of the bore 18 of each adapter 15 are complementary to the transverse cross-sectional configuration and dimensions of the upper end portion 13 of the valve stem 12 of a faucet valve of a different manufacturer, with the lengths of the bores 18 of the respective adapters 15 corresponding to the lengths of the upper end portions 13 of the valve stems 12 of the faucet valves of the different manufacturers, and with the length of the second end portion 17 of each respective adapter 15 being such that, with the replacement faucet handle 20 operatively installed as hereinafter described, the handle 20 is at substantially the same pre-determined level as the original manufacturer's faucet handle. Thus, as shown by way of example in FIGS. 3 and 4, the bores 18 of the adapters 15 are of different diameters and incorporate longitudinally extending ribs 19 which in the bores 18 of the different adapters 15 are differently angularly spaced and may be of different dimensions. In addition, as shown in FIGS. 3 and 4 the bores 18 in the different adapters 15 are of different lengths, and the second end portions 17 of the different adapters 15 are of different lengths. While in FIGS. 3 and 4 the bores 18 of the adapters 15 are both shown as being cylindrical with the longitudinally extending ribs 19, it will be appreciated that if there are in use faucet valves the upper end portions of the valve stems of which are of non-circular transverse cross-sectional configuration, other than of cylindrical form incorporating longitudinally extending spline grooves, a replacement faucet kit according to the present invention may include adapters 15 the bores 18 of which are of non-circular transverse cross-sectional configuration complementary to the non-circular, transverse cross-sectional configuration of the upper end portions of the valve stems of these faucet valves.

The replacement faucet handle 20 has an underface 21 in which is provided a recess 22 the transverse cross-sectional configuration of which is complementary to that of the first end portion 16 of each of the adapters 15.

In order to install the replacement faucet handle 20 of the kit according to the present invention the former faucet handle is, of course, first removed, and a selected one of the adapters 15 the bore 18 of which has a non-circular, transverse cross-sectional configuration and dimensions complementary to those of the upper end portion 13 of the valve stem 12, and a length corresponding to that of the upper end portion 13 of the valve stem 12, is then non-rotatably mounted on the upper end portion 13 of the valve stem 12 by disposing the upper end portion 13 of the valve stem 12 within the bore 18 of said selected adapter 15. The handle 20 is then non-rotatably mounted on said selected adapter 15 by disposing the first end portion 16 of said selected adapter 15 within the recess 22 in the handle 20, the length of the second end portion 17 of said selected adapter 15 being such that the handle 20 is at substantially the same pre-determined level as was the former faucet handle of the original manufacturer's equipment.

Means is provided for permitting securement of the handle 20 and said selected adapter 15 to the upper end portion 13 of the valve stem 12, this means preferably comprising a hole 23 which extends through the handle 20 between the recess 22 and the top face of the handle 20, and an open-ended passage 24 which extends through the first and second end portions 16, 17 of each adapter 15. A locking screw 25 is disposed through the hole 23 and the open-ended passage 24 of said selected adapter 15 and is engaged within the screw-threaded bore 26 in the upper end portion 13 of the valve stem 12 thereby to secure the handle 20 and said selected adapter 15 to the upper end portion 13 of the valve stem 12.

The handle 20 may be of transparent material such as an acrylic plastics material, and in this case in order to enhance the appearance of the replacement faucet handle 20 when installed there is preferably included in the replacement faucet handle kit an opaque skirt member 27 which may be of chrome-plated material and which is adapted to be received within a concavity 28 in the underface 21 of the handle 20, thereby when the replacement faucet handle 20 is installed to shield from view the second end portion 17 of said selected adapter 15 and the upper end portion 13 of the valve stem 12. As will of course be appreciated an opening 29 which is preferably of a shape complementary to the transverse cross-sectional configuration of the first end portion 16 of each adapter 15 is provided in the skirt member 27 for disposition of the first end portion 16 of said selected adapter 15 therethrough. Furthermore, each adapter 15 preferably incorporates between the first and second end portions 16, 17 thereof an outwardly projecting flange 30 which operatively serves securely to clamp the skirt member 27 when the replacement faucet handle 20 is in its installed condition. A cap 31 may be removably snap mounted in a recess 32 in the top face of the handle 20 thereby to cover the head of the locking screw 25, and as is conventional in the art this cap 31 may on its outer face bear appropriate marking such as the letter "H" or "C" to identify the handle 20 as controlling the supply of hot or cold water, respectively.

Thus, the present invention provides a replacement faucet handle kit which is of simple and inexpensive form and which substantially overcomes or mitigates the disadvantages of the previously known and used forms of replacement faucet handle kits hereinbefore described.

I claim:

1. In combination a replacement faucet handle for replacing an original faucet handle, a skirt member having an opening therein, a plurality of adapters each having a first end portion adapted to be connected to the replacement faucet handle, a second end portion adapted to be connected to an upper end portion of a faucet valve stem, and an outwardly projecting flange between the first end portion and the second end portion of the adapter, and means permitting securement of the replacement faucet handle and a selected one of the adapters to the upper end portion of the faucet valve stem on which the original faucet handle has been mounted at a predetermined level, the replacement faucet handle having an underface, a concavity in said underface of the handle, and a recess provided in said concavity in said underface of the handle, the first end portions of the adapters being substantially identical and each being of non-circular, transverse cross-sectional configuration complementary to the transverse cross-sectional configuration of the recess in the handle, and the second end portion of each adapter having a bore of non-circular transverse cross-sectional configuration, with the second end portion of each adapter differing from the second end portion of each remaining adapter with respect to at least one characteristic selected from the group of characteristics consisting of the length thereof, the length of the bore therein, and the transverse cross-sectional dimensions of the bore therein, the length and transverse cross-sectional configuration and dimensions of the bore in the second end portion of said selected one of the adapters being complementary to the length and transverse cross-sectional configuration and dimensions of the upper end portion of the faucet valve stem, whereby said selected one of the adapters is adapted to be non-rotatably mounted on the upper end portion of the faucet valve stem by disposing the upper end portion of said faucet valve stem within said bore in the second end portion of said selected one of the adapters, and the replacement faucet handle is adapted to be non-rotatably mounted on said selected one of the adapters by disposing only the first end portion of said selected one of the adapters through the opening in the skirt member and within the recess in the replacement faucet handle, with the skirt member disposed within the concavity in the underface of the handle, the replacement faucet handle and said selected one of the adapters being securable to the upper end portion of the faucet valve stem with the skirt member securely clamped in the concavity in the underface of the replacement faucet handle by the outwardly projecting flange of said selected one of the adapters, wherein the length of said second end portion of said selected adapter is such that when the replacement faucet handle and said selected adapter are secured to the upper end portion of the faucet valve stem the replacement faucet handle is positioned at substantially said predetermined level at which the original faucet handle has been mounted on the upper end portion of the faucet valve stem.

2. A combination according to claim 1, wherein the handle has a top face, a hole extends through the handle between the recess in the underface and said top face of the handle, and the adapters each have an open-ended passage extending through the first and second end portions thereof, said securement permitting means comprising said hole through the handle and said open-ended passage through said selected one of the adapters, with said hole and open-ended passage being adapted to receive therethrough a locking screw which is adapted to be engaged with a screw-threaded bore in the upper end portion of the faucet valve stem for securing the handle and said selected one of the adapters to the upper end portion of the faucet valve stem.

3. A combination according to claim 1, wherein the recess in the handle and the first end portion of each adapter are of non-tapered form.

* * * * *